(12) United States Patent
Haldar et al.

(10) Patent No.: US 10,186,746 B2
(45) Date of Patent: Jan. 22, 2019

(54) RECONFIGURABLE WAVEGUIDE FOR SPIN WAVE TRANSMISSION

(71) Applicant: National University of Singapore, Singapore (SG)

(72) Inventors: Arabinda Haldar, Singapore (SG); Dheeraj Kumar, Singapore (SG); Adekunle Adeyeye, Singapore (SG)

(73) Assignee: National University of Singapore, Singapore (SG)

( * ) Notice: Subject to any disclaimer, the term of this patent is extended or adjusted under 35 U.S.C. 154(b) by 35 days.

(21) Appl. No.: 15/383,313

(22) Filed: Dec. 19, 2016

(65) Prior Publication Data

US 2017/0179561 A1 Jun. 22, 2017

Related U.S. Application Data

(60) Provisional application No. 62/270,093, filed on Dec. 21, 2015.

(51) Int. Cl.
*H01P 3/08* (2006.01)
*H01P 11/00* (2006.01)
*H01F 1/00* (2006.01)
*B82Y 20/00* (2011.01)

(52) U.S. Cl.
CPC ............ *H01P 3/08* (2013.01); *H01F 1/0036* (2013.01); *H01P 11/003* (2013.01); *B82Y 20/00* (2013.01)

(58) Field of Classification Search
None
See application file for complete search history.

(56) References Cited

U.S. PATENT DOCUMENTS

| 8,487,391 | B2 * | 7/2013 | Kim | H01P 1/218 257/421 |
| 8,625,335 | B2 * | 1/2014 | Morise | G11C 19/0841 365/157 |
| 9,767,876 | B2 * | 9/2017 | Khitun | G11C 11/1673 |
| 2018/0025851 | A1 * | 1/2018 | Lie | H01G 11/28 429/9 |

OTHER PUBLICATIONS

Lee et al., "Physical Origin and Generic Control of Magnonic Band Gaps of Dipole-Exchange Spin Waves in Width-Modulated Nanostrip Waveguides", Mar. 27, 2009, The American Physical Society, Physical Review Letter, 127202.*

* cited by examiner

*Primary Examiner* — Dean Takaoka
*Assistant Examiner* — Alan Wong
(74) *Attorney, Agent, or Firm* — Michael Best & Friedrich LLP

(57) ABSTRACT

A waveguide for spin wave (SW) transmission, a method of fabricating a waveguide for SW transmission, and a method of transmitting an SW. The waveguide comprises a plurality of nanomagnetic material elements, each nanomagnetic material element having a respective predetermined geometric shape such that each nanomagnetic material element exhibits a deterministic ground state initializable by a magnetic field applied across the waveguide; wherein the nanomagnetic material elements are disposed relative to each other for dipolar coupling between adjacent nanomagnetic material elements.

17 Claims, 13 Drawing Sheets

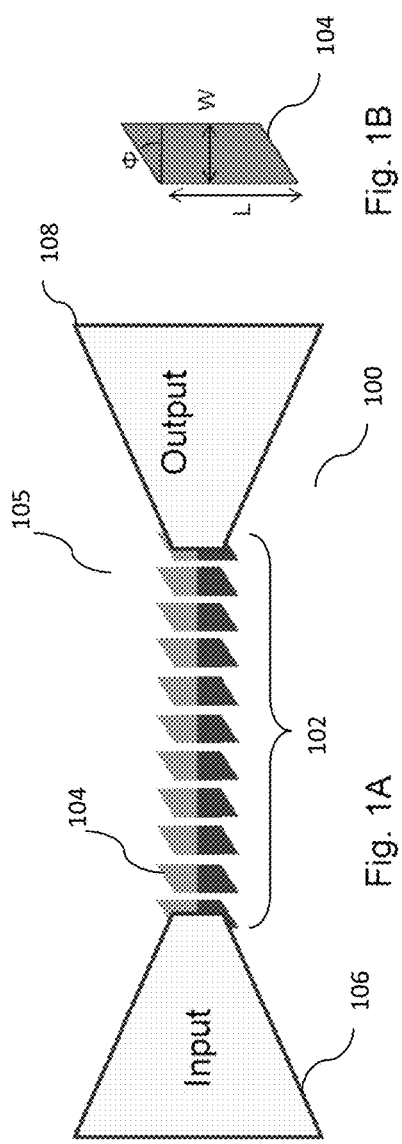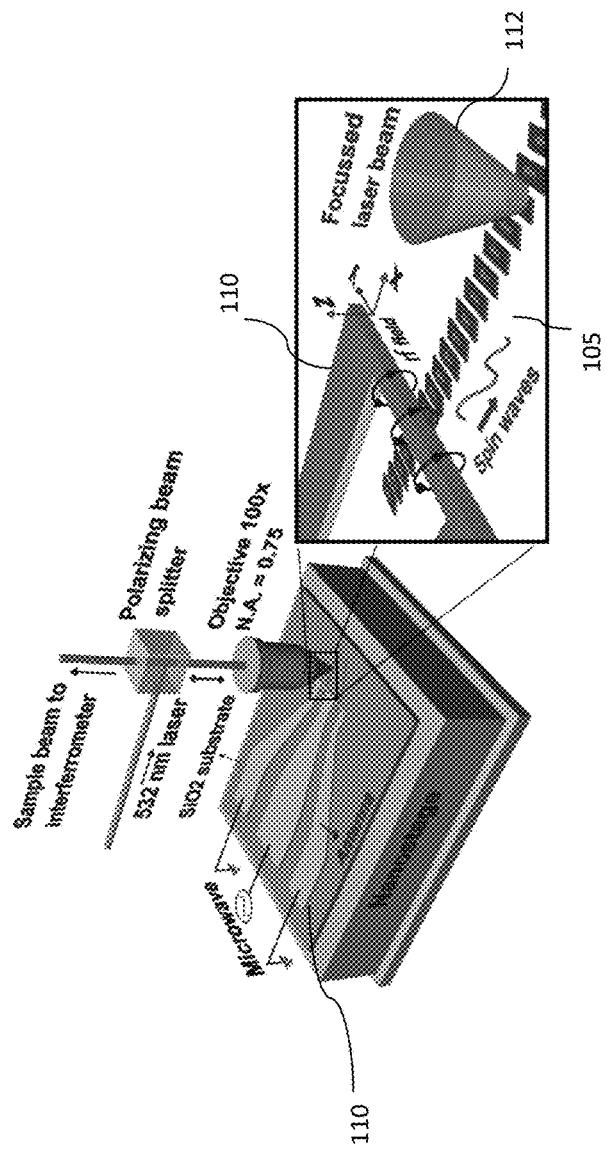

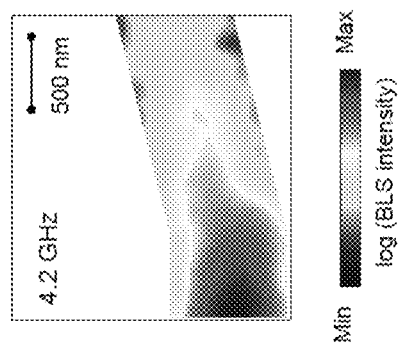
Fig. 5B
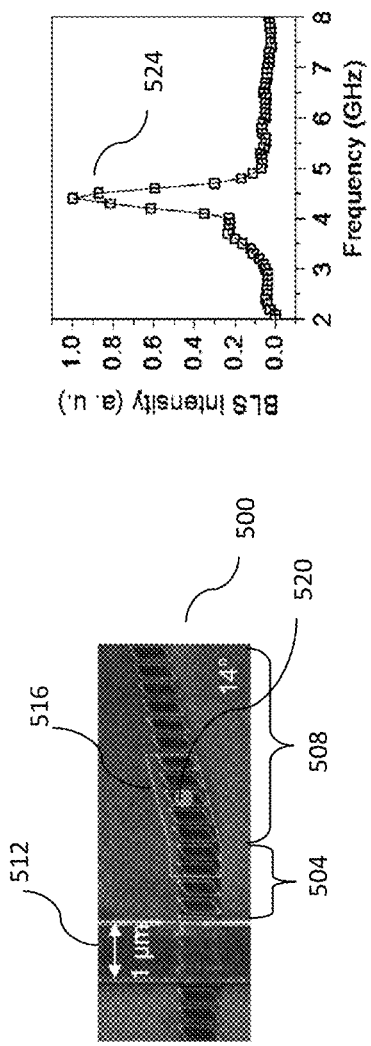
Fig. 5A
Fig. 5C

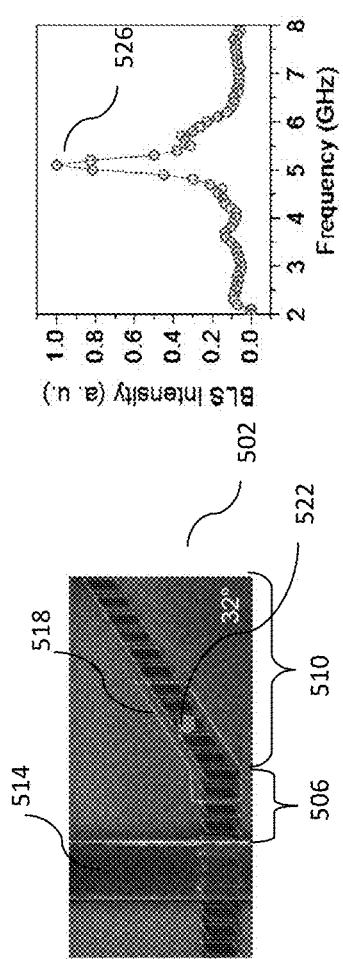
Fig. 5D
Fig. 5E
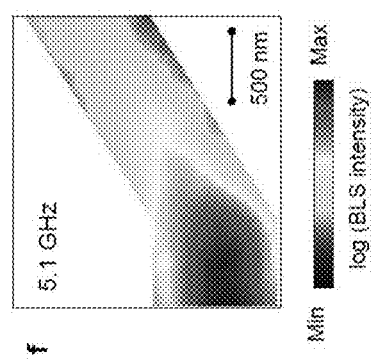
Fig. 5F

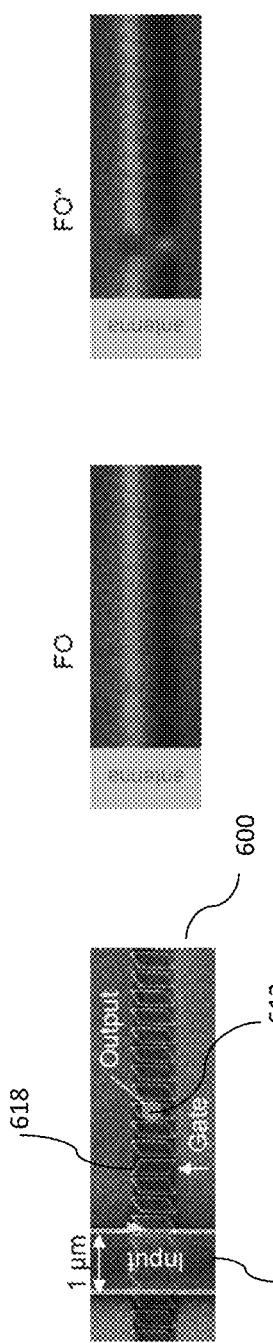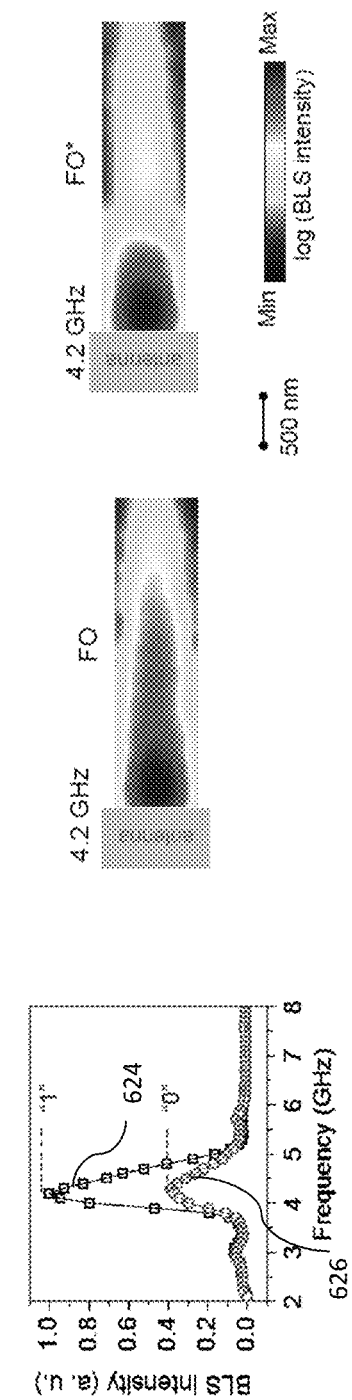

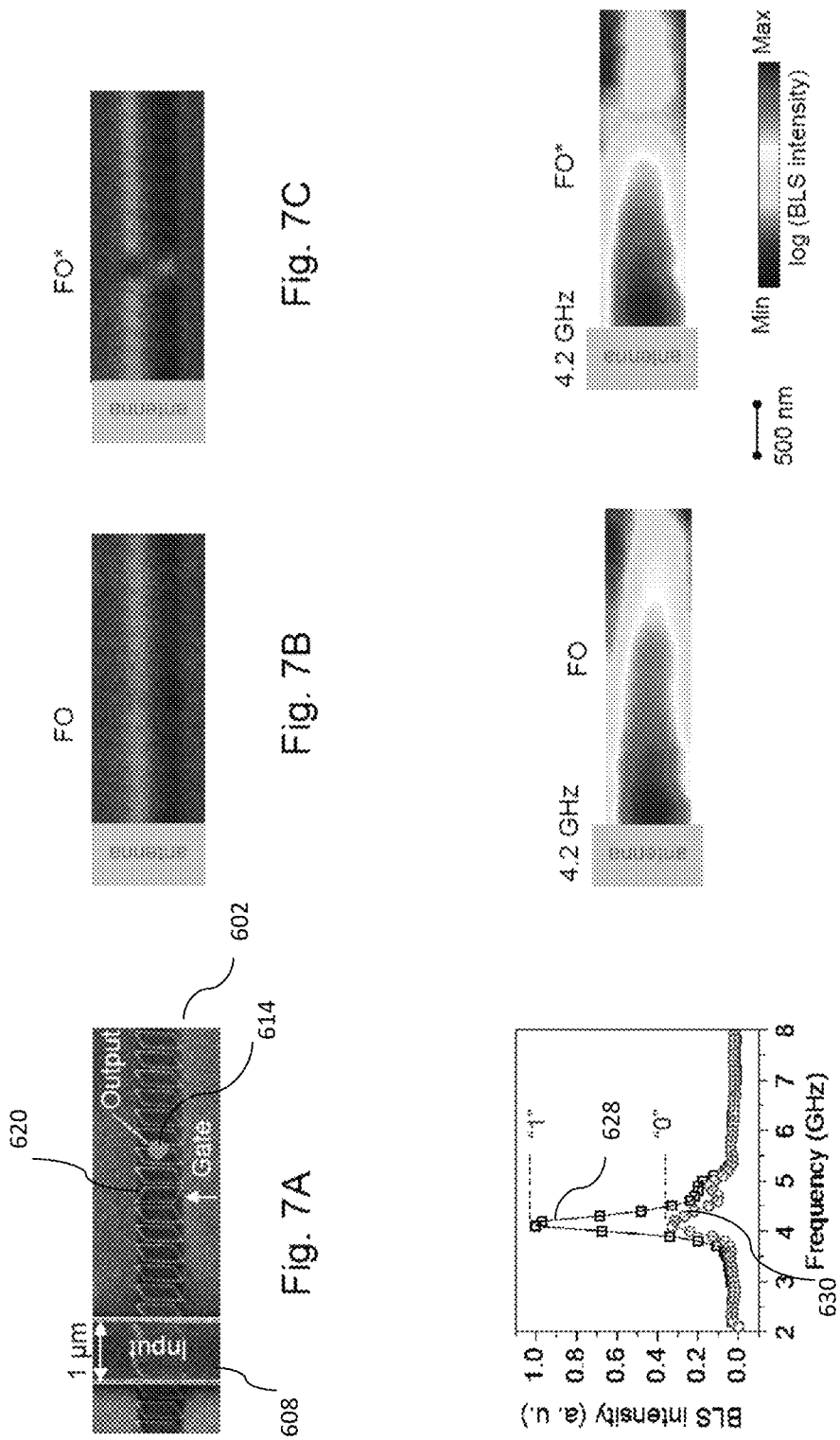

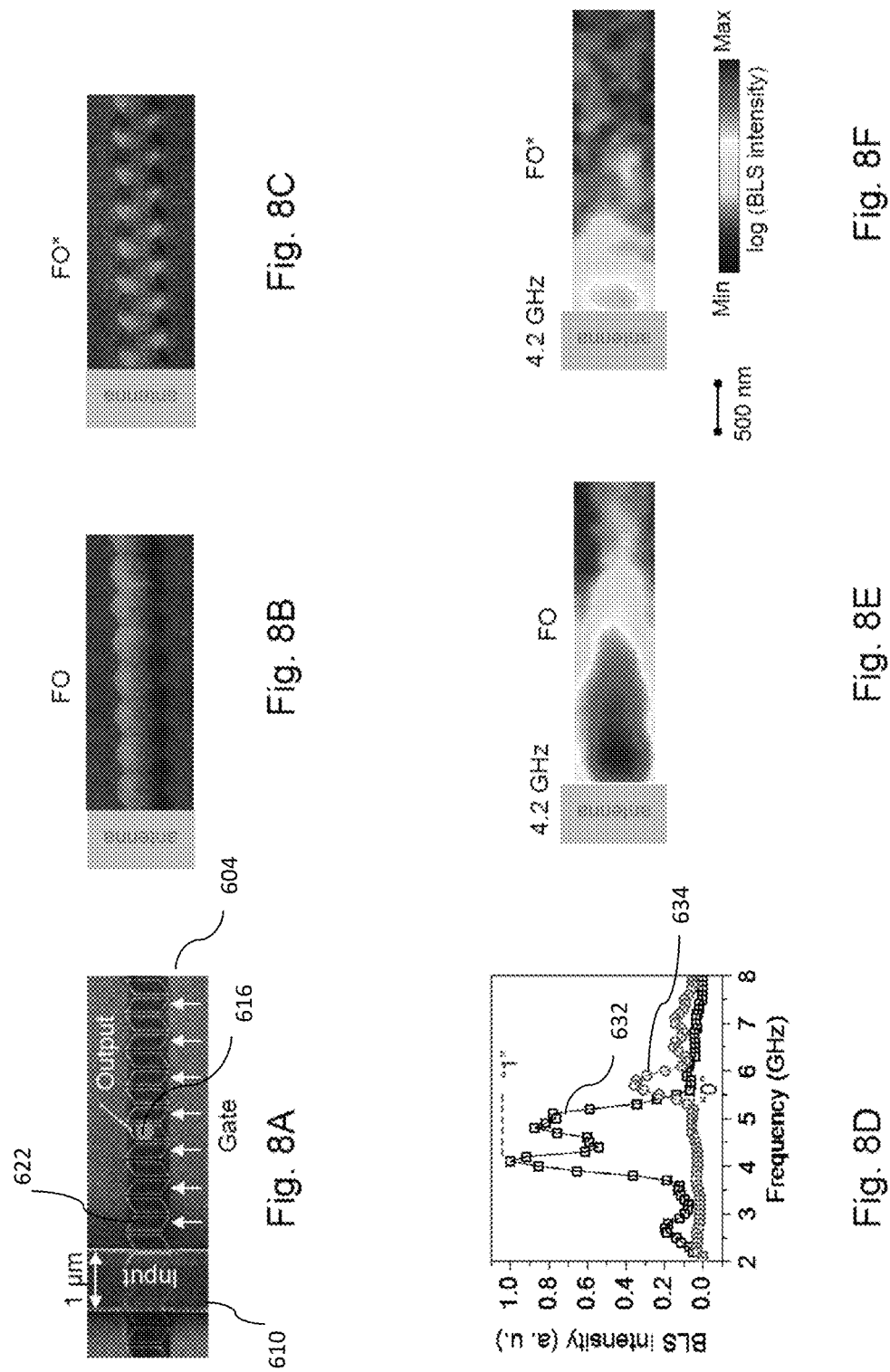

RECONFIGURABLE WAVEGUIDE FOR SPIN WAVE TRANSMISSION

CROSS-REFERENCE TO RELATED APPLICATION

This application claims the benefit of priority of U.S. Provisional Patent Application No. 62/270,093 filed on Dec. 21, 2015, the content of which is incorporated herein by reference in its entirety for all purposes.

TECHNICAL FIELD

This invention relates broadly to magnon transport, particularly to magnon current manipulation using reconfigurable waveguides made from interacting nanomagnetic chains for energy-efficient transmission and local manipulation of information in a nanomagnetic device.

BACKGROUND

Magnonics—magnetic analogue to photonics—is amongst the promising post-complementary metal-oxide semiconductor (CMOS) computing technologies in which the spin waves (SWs) or magnons (quanta of SWs) carry the information instead of charge. Significant progress has been made towards the practical realization of magnonic devices in-terms of on-chip generation, directional channeling, detection and manipulation of SWs. One of the building blocks of any magnonic devices is the waveguide that transmits SWs from one physical location to another. Waveguides in the form of micro-stripes or wires are generally used in proof-of-principle nanomagnetic devices where the SW propagation is limited by the material dependent Gilbert damping. The SW decay length varies from several microns to few tens of microns in the commonly used materials such as Ni80Fe20 (Permalloy), Heusler alloy, CoFeB and Yttrium Iron Garnet (YIG).

Magnetostatic surface SWs or the Demon-Eshbach (DE) SW modes which propagate perpendicular to the in-plane magnetization direction, are promising in this context due to their large group velocities (vg), low attenuation and suitability for experimental implementations. Consequently, in a typical micro-strip waveguide, a large external bias magnetic field (typically 500-1200 Oe) is used to force the magnetization to orient perpendicular to the SW propagation direction. This is a major obstacle for implementing such waveguides into a practical device. Also, such global external field does not support DE configuration for transmitting signal through a curved waveguide which was later addressed by utilizing the Oersted field generated from an underlying current carrying stripe that may also be used for straight waveguides. Although waveguides with underlying current lines may in principle be integrated into a device for on-chip biasing, it will continuously draw power and the heat generated in a dense circuit could inhibit the benefits of a magnonic device which promises to deliver ultra-low power computing. Therefore, an alternative energy-efficient approach for SW transport in straight as well as curved waveguides is desired. Recently, it has been shown theoretically that SW transmission through bents is possible using domain walls in ultrathin ferromagnetic films.

Another important element to obtain digital functionalities is the local manipulation of amplitude and/or phase of the propagating signal. Several methodologies have been adopted which include the use of magnetic field inhomegenity, non-linear SW properties, dynamic magnonic crystal (MC), variation of local magnetization orientation, SW phase manipulation. Thus, a waveguide with a simple design and energy-efficient local manipulation mechanism can be of significant technological importance.

Embodiments of the present invention seek to address one or more of the above-mentioned needs.

SUMMARY

In accordance with a first aspect of the present invention there is provided a waveguide for spin wave (SW) transmission comprising a plurality of nanomagnetic material elements, each nanomagnetic material element having a respective predetermined geometric shape such that each nanomagnetic material element exhibits a deterministic ground state initializable by a magnetic field applied across the waveguide; wherein the nanomagnetic material elements are disposed relative to each other for dipolar coupling between adjacent nanomagnetic material elements.

In accordance with a second aspect of the present invention there is provided a method of fabricating a waveguide for spin wave (SW) transmission, comprising the steps of providing a plurality of nanomagnetic material elements, each nanomagnetic material element having a respective predetermined geometric shape such that each nanomagnetic material element exhibits a deterministic ground state initializable by a magnetic field applied across the waveguide; and disposing the nanomagnetic material elements relative to each other for dipolar coupling between adjacent nanomagnetic material elements.

In accordance with a third aspect of the present invention there is provided a method of transmitting a spin wave (SW), comprising the steps of providing a plurality of nanomagnetic material elements, each nanomagnetic material element having a respective predetermined geometric shape such that each nanomagnetic material element exhibits a deterministic ground state initializable by a magnetic field applied across the waveguide; disposing the nanomagnetic material elements relative to each other for dipolar coupling between adjacent nanomagnetic material elements; and exciting the SW in one of the nanomagnetic material elements for transmission through one or more other ones of the nanomagnetic material elements.

BRIEF DESCRIPTION OF THE DRAWINGS

The invention will be better understood with reference to the detailed description when considered in conjunction with the non-limiting examples and the accompanying drawings, in which:

FIG. 1A shows a schematic drawing illustrating a device according to an example embodiment. The waveguide is made from physically separated but dipolar coupled rhomboid nanomagnets (RNMs). Input is referred to source of magnon excitation. Output indicates the detection of magnon current.

FIG. 1B shows the dimensions of a single RNM of the device of FIG. 1A where (L×w×Φ=600 nm×260 nm×32°.

FIG. 1C shows the experimental set-up used according to an example embodiment showing the incident and scattered laser beams, the device of FIG. 1A on the nanostage and the microwave excitation. A zoomed in view of the waveguide shows the constituting nanomagnets, the direction of rf-excitation field and SW propagation coordinate. The inter-element separation ($\delta$) between the RNMs is 50 nm.

FIG. 5A shows the SEM image of a curved waveguide according to an example embodiments with 14° bent.

FIG. 5B is the BLS spectrum measured at 2 μm away from the antenna for the waveguide of FIG. 5A.

FIG. 5C shows the two-dimensional map of the SW intensity for the waveguide of FIG. 5A at 4.2 GHz. The laser spot was raster scanned in 100 nm steps starting 0.8 μm away from the antenna.

FIG. 5D shows the SEM image of a curved waveguides according to an example embodiment with 32° bent.

FIG. 5E is the BLS spectrum measured at 2 μm away from the antenna for the waveguide of FIG. 5D.

FIG. 5F shows the two-dimensional map of the SW intensity for the waveguide of FIG. 5D at 5.1 GHz. The laser spot was raster scanned in 100 nm steps starting 0.8 μm away from the antenna.

FIG. 6A shows the SEM image of a device according to an example embodiments with input, output and gate. This example embodiment is to show the gating operation of magnon signal. The input refers to the microwave strip line. The output is measured by the BLS at the location of the dot. The gate is defined by the geometrical orientation of the RNM.

FIG. 6B is the MFM image corresponding to the SEM image of FIG. 6A at remanence after initialized along the long axis of the nanomagnets. This is referred to as ferromagnetically ordered (FO) state.

FIG. 6C is the MFM image corresponding to the SEM image of FIG. 6A at remanence after initialized along the short axis of the nanomagnets. This is referred to as FO* state which indicates a defect in the otherwise FO state.

FIG. 6D show the BLS spectra for the device shown in FIG. 6A measured at FO state (squares) and FO* state (circles). The output levels are marked as "1" and "0" for high and low signal.

FIGS. 6E & 6F are the two dimensional SW intensity map for the device shown in FIG. 6A at 4.2 GHz for FO and FO* states. The area of the scanned regions are 3 μm×0.8 μm.

FIG. 7A shows the SEM image of a device according to an example embodiments with input, output and gate. This example embodiment is to show the gating operation of magnon signal. The input refers to the microwave strip line. The output is measured by the BLS at the location of the dot. The gate is defined by the geometrical orientation of the RNM.

FIG. 7B is the MFM image corresponding to the SEM image of FIG. 7A at remanence after initialized along the long axis of the nanomagnets.

FIG. 7C is the MFM image corresponding to the SEM image of FIG. 7A at remanence after initialized along the short axis of the nanomagnets.

FIG. 7D show the BLS spectra for the device shown in FIG. 7A measured at FO state (squares) and FO* state (circles). The output levels are marked as "1" and "0" for high and low signal.

FIGS. 7E & 7F are the two dimensional SW intensity map for the device shown in FIG. 7A at 4.2 GHz for FO and FO* states. The area of the scanned regions are 3 μm×0.8 μm.

FIG. 8A shows the SEM image of a device according to an example embodiment with input, output and gate. This example embodiment is to show the gating operation of magnon signal. The input refers to the microwave strip line. The output is measured by the BLS at the location of the dot. The gate is defined by the geometrical orientation of the RNM.

FIG. 8B is the MFM image corresponding to the SEM image of FIG. 8A at remanence after initialized along the long axis of the nanomagnets.

FIG. 8C is the MFM image corresponding to the SEM image of FIG. 8A at remanence after initialized along the short axis of the nanomagnets.

FIG. 8D show the BLS spectra for the device shown in FIG. 8A measured at FO state (squares) and FO* state (circles). The output levels are marked as "1" and "0" for high and low signal.

FIGS. 8E & 8F are the two dimensional SW intensity map for the device shown in FIG. 8A at 4.2 GHz for FO and FO* states. The area of the scanned regions are 3 μm×0.8 μm.

DETAILED DESCRIPTION

Figure 1E:
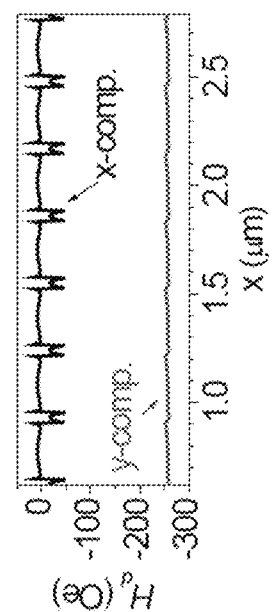
FIG. 1E shows the line scan of the demagnetization field (x and y-component) distributions along the center of the waveguide of the device of FIG. 1A.

Example embodiments described herein demonstrate nanoscale waveguide designs which advantageously support SW transmission in straight as well as curved structures without the use of any external bias magnetic field or current. Long range dynamic dipolar field is utilized in example embodiments for SW transmission in the waveguides which consists of dipolar coupled rhomboid shaped nanomagnets (RNMs) that possess well-defined magnetization orientations at remanence due to geometrically induced shape anisotropy. Example embodiments described herein further demonstrate the gating of signal propagation by controlling individual nanomagnets at the nanoscale. Advantageously, example embodiments demonstrate that no standby power is required during the operation of the device once it is configured—supporting energy-efficient computing.

In example embodiments, several devices were fabricated on a single chip. A chain of physically separated but magnetostatically coupled RNMs is used as a waveguide for SWs. RNMs are special in the sense that they possess a well-defined magnetic ground state upon field initialization along their long and short axes. The length (L), width (W), thickness (t) and angle (Φ) of the slanted edge of a single RNM are 600 nm, 260 nm, 25 nm and 32°, respectively. The separation (δ) between the nanomagnets is 50 nm in example embodiments. The waveguides are made from metallic ferromagnetic material, Permalloy (Ni80Fe20). SWs are excited in the waveguides using a 1-μm-wide (d) stripe antenna by passing rf-current through it. In order to probe SWs locally down to a single nanomagnet scale in the waveguides, micro-focused Brillouin light scattering (micro-BLS) technique with a laser spot diameter of 250 nm is used.

Propagation of magnon current has been demonstrated in straight waveguides made from such interacting RNM chains in example embodiments. In the straight waveguides, a strong SW signal is found around 4.2 GHz including a weak response at around 3 GHz. It is noted that the effect of far field excitation by the antenna was found to be negligible in measurements for example embodiments, which was confirmed experimentally by comparing the results with a control sample. Two-dimensional spatial profiles for the prominent magnon signal at 4.2 GHz show exponential decay of the signal which is a characteristic of propagating surface magnons. From the fits, the decay length of about 1 μm is obtained which is smaller than the decay length in a micro-stripe waveguide. It is also noted that the intensity of the propagating SWs reduces with increasing inter-element gap, δ, which may be attributed to the reduction in the dipolar coupling and the group velocity.

Channeling SWs at different angles is realized in example embodiments using the same device architecture. Two devices according to example embodiments are described in which the waveguides are straight for the first four nanomagnets followed by 14° and 32° bents with respect to their antennae. Transmission of spin-wave signal at angles is observed with strong response around 4.2 GHz and 5.1 GHz for 14° and 32° curved waveguides, respectively, according to example embodiments. The SW intensity drops faster as compared to the straight waveguide due to modification in the dynamic dipolar field near the bent which reduces the transmission efficiency. Nevertheless, clear BLS intensities can be observed much beyond the bent in the waveguide. It is noted that the 32° curved waveguide supports the SW mode at a higher frequency in comparison to the straight waveguide, according to respective example embodiments.

In order to obtain digital functionalities, deterministic control of signal output which is encoded in the amplitude and/or phase of the magnons, is desired. A mechanism according to example embodiments is described to manipulate the amplitude of the propagating SWs. In order to experimentally demonstrate the proof-of-concept, three devices according to example embodiments are described. In these devices, the input refers to the microwave excitation using antennae and the output is monitored by measuring the BLS intensity, thereby, the magnon amplitude. Gating operation is realized by selectively patterning the waveguides and switching individual nanoelement at the gate position using an external field. The BLS intensities at the output indicate that the signal is strongly attenuated in the region after the reversed magnet position in comparison to the otherwise saturated state.

The advantages of the devices according to example embodiments can include non-volatile operation, unlimited signal transfer endurance, high speed signal processing, ease of device integration, and nanoscale control of signal.

Overview of the experimental set-up and device concept according to example embodiments.

FIG. 1A shows a schematic drawing of a device 100 according to an example embodiment. A chain 102 of physically separated but magnetostatically coupled RNMs e.g. 104 is used as a waveguide 105 for SWs, disposed between an input 106 and an output 108 of the device 100. RNMs e.g. 104 possess well-defined magnetic ground state upon field initialization along their long ($H_{in}^L$) and short ($H_{in}^W$) axes. FIG. 1B depicts the dimensions of a single RNM e.g. 104. The length (L), width (W), thickness (t) and angle (Φ) of the slanted edge of the single RNM e.g. 104 according to an embodiment are 600 nm, 260 nm, 25 nm and 32°, respectively. The separation (δ) between the nanomagnets is 50 nm in an embodiment. The waveguides e.g. 105, i.e. the RNMs e.g. 104, are made from metallic ferromagnetic material, Permalloy (Ni80Fe20), in an example embodiment. SWs are excited in the waveguides e.g. 105 using a 1-μm-wide (d) stripe antenna 110 (FIG. 1C) by passing rf-current through it. Thus, the stripe antenna 110 acts as the input 106 (FIG. 1A) in an example embodiment. The rf-field generated by this antenna 110 along the waveguide 105 vanishes at $2\pi/d=6.2$ rad/μm. It is noted that this excitation method is generally used for experimental investigations, as the spin transfer torque based approach, which is suitable for device implementation, involves a more complex fabrication processes. It is noted that the nanomagnets may take other geometric shapes or alignments in addition to rhomboid to achieve reconfigurable waveguide.

In order to probe SWs locally down to a single nanomagnet scale in the waveguides e.g. 105, micro-focused Brillouin light scattering (micro-BLS) technique is used with a laser spot diameter of the focused laser beam 112 of 250 nm, in an example embodiment. Thus, BLS is used to monitor the output 108 (FIG. 1A) of the device in an example embodiment. Prior to any analysis, each BLS spectrum was normalized with respect to their reference intensity to account for any fluctuations on the incident laser intensity.

Figure 1D:
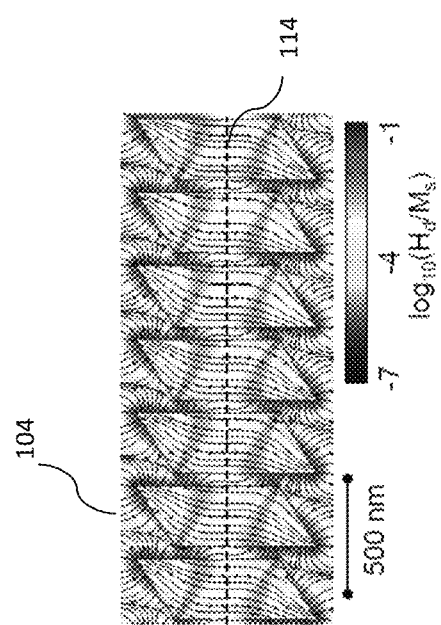
FIG. 1D is the calculated demagnetization field (Hd) distributions is shown for a section of the waveguide of the device of FIG. 1A. Data were normalized to the saturation magnetization (MS).

FIG. 1D shows the calculated demagnetizing field ($H_d$) when all the RNMs e.g. 104 are ferromagnetically ordered (FO) and FIG. 1E shows how the x- and y-component of this demagnetizing field ($H_d$) changes along the dashed line 114 marked in FIG. 1D. In this magnetic configuration, the SW signal transmission is expected to be mediated by long range dynamic dipolar field as observed in SW tunneling. A mechanism whereby SW signal transmission mediated by long range dynamic dipolar field was also used in to Barman, S., Barman, A. & Otani, Y. Controlled propagation of locally excited vortex dynamics in linear nanomagnet arrays. J. Phys. D 43, 335001 (2010), which describes signal transfer in magnetic vortex networks via vortex core gyrations where the operating frequency is limited by the speed of the vortex gyration.

Magnon transmission in a straight waveguide without any bias field according to example embodiments.

Figure 2A:
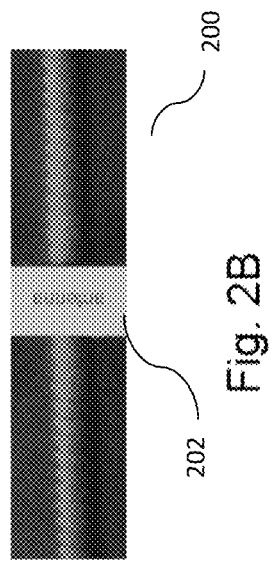
FIG. 2A is the SEM image of a straight waveguide according to an example embodiment with an antenna of 1 μm width.

In order to demonstrate the propagation of SWs in waveguides according to example embodiments, a long waveguide 200 was fabricated as shown in the Secondary Electron Microscopy (SEM) image in FIG. 2A using electron beam lithography and lift-off techniques. The antenna 202 was fabricated on top of the waveguide 200 using a combination of e-beam and optical lithography. Prior to any measurements the samples were initialized by applying and subsequently removing a saturating field across the long axes of the respective RNMs. ($H_{in}^L$:1000 Oe→0).

Figure 2B:
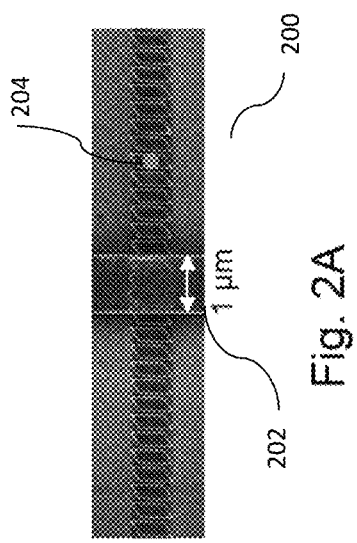
FIG. 2B is the MFM image corresponding to the SEM image of FIG. 2A showing the magnetization configuration at remanence.
Figure 2C:
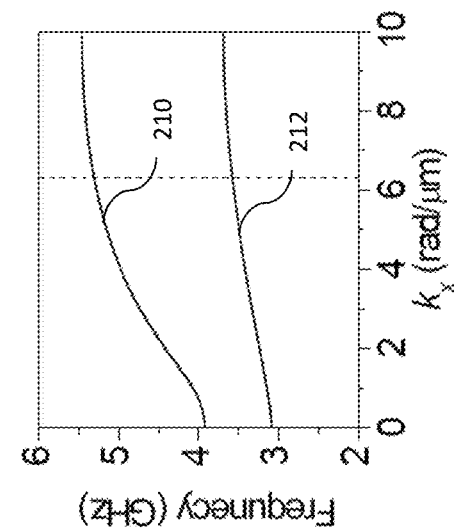
FIG. 2C shows the BLS spectrum as function of rf-excitation frequency for the waveguide of FIG. 2A. The dot in the SEM image (FIG. 2A) represents the location where the BLS spectrum was recorded.
Figure 2D:
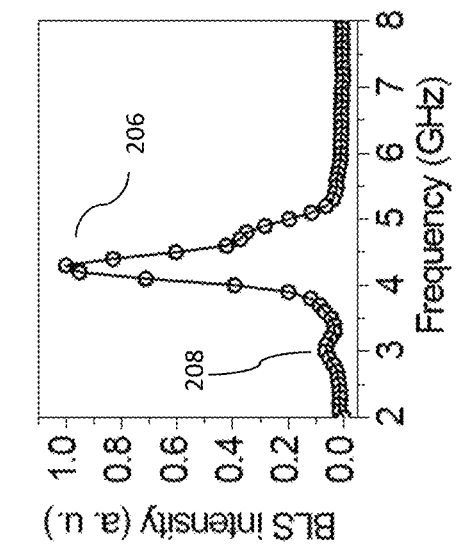
FIG. 2D shows the dispersion curves for the two lowest order SW modes obtained from corresponding micromagnetic simulations without any bias magnetic field.

FIG. 2B shows the magnetization configurations at remanence, imaged using magnetic force microscopy (MFM), which confirms a FO state. It is noted that this FO state can also be achieved by field initializing along the short axes of the respective RNMs ($H_{in}^W$: 1000 OO→0). In order to measure SW signal in the waveguide 200, BLS intensities are recorded as a function of rf-excitation frequency in the range of 2-8 GHz in 100 MHz increments without an external field. The BLS spectrum is shown in FIG. 2C. The position of the focused laser spot is indicated by a circular dot 204 in the SEM image shown in FIG. 2A. The size of this dot 204 represents the nominal size of the laser spot with respect to the sample in an example embodiment. In the BLS spectrum, a strong SW signal 206 is found around 4.2 GHz including a weak response 208 at around 3 GHz. The width of the 4.2 GHz frequency band is about 1 GHz. The lower frequency mode disappears in the presence of an external bias field which indicates that it corresponds to the inhomogeneous magnetization at the edges which are absent in a saturated sample. The dispersive lower order modes 210, 212, as calculated using micromagnetic simulation, are shown in FIG. 2D. The position of the frequency bands appears to agree well with the spectrum obtained using BLS in FIG. 2C. It is noted that the SW mode 212 near 3 GHz in the BLS spectrum appears with lower slope (group velocity <0.5 km/s), when compared to the most prominent mode 210 at 4.2 GHz, where the group velocity ranges over 1.1 km/s.

Figure 2E:
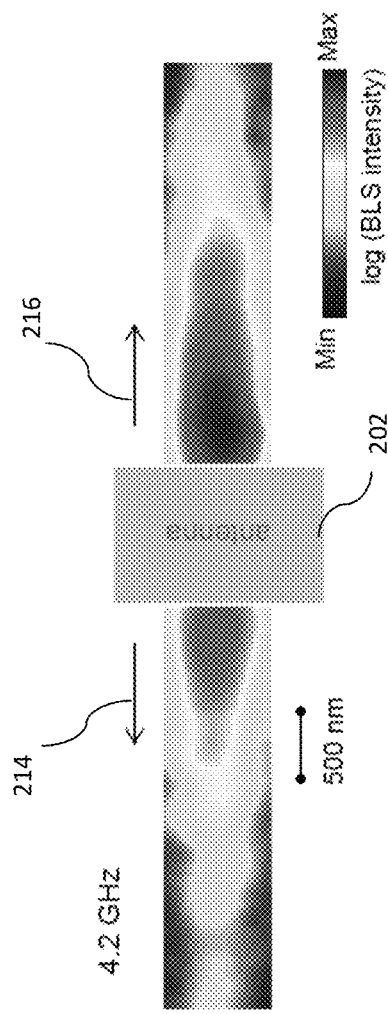
FIG. 2E shows the two-dimensional spatial map of the BLS intensity for the 4.2 GHz SW mode in the BLS spectrum of FIG. 2C on the left and right side of the antenna (compare FIG. 2A). For this data BLS intensity, proportional to the SW intensity, was recorded over a 3 μm×0.8 μm area on both sides of the antenna by rastering the laser spot in 100 nm step.
Figure 2F:
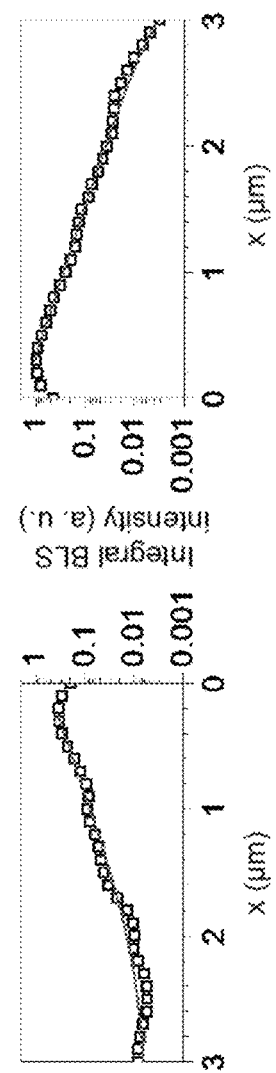
FIG. 2F shows the dependence of BLS integral intensity (squares) on the propagation coordinate on both sides of the antenna, as derived from the data shown FIG. 2E. The lines represent the fit to the measured data using an exponential function as described in the description below.

Micromagnetic simulations also show that the lower frequency mode 212 is concentrated at the base of the slanted edges of the RNMs whereas the higher frequency SW mode 210 is located at the centre of the RNMs. FIG. 2E shows two-dimensional spatial profile for the prominent SW signal at 4.2 GHz on both sides of the antenna 202. Arrows 214, 216 indicate the direction of spin-wave propagation. For this measurement, the laser spot was raster scanned in 100 nm steps over an area of 3 μm×0.8 μm on both sides of the antenna 202. FIG. 2F represents the spatial decay of the BLS intensity integrated over the transverse section of the map. It is noted that a logarithmic vertical axis for BLS intensity is used in FIG. 2F. The asymmetry of the BLS intensities on the left and right side of the antenna 202 may arise due to the non-reciprocal SW excitation by the antenna 202. The exponential decay of the SWs is fitted to the function $\exp(-2x/\xi)$, where $\xi$ is the decay length which represents the distance where the intensity drops by a factor of e. From the fits, we obtain $\xi$ of about 1 μm which is smaller than the decay length in a micro-stripe waveguide in the DE geometry.

Figure 3A:
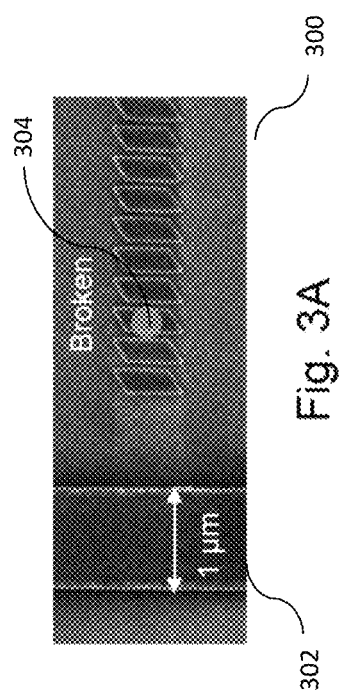
FIG. 3A shows the SEM image of a broken waveguide for comparative analysis.
Figure 3B:
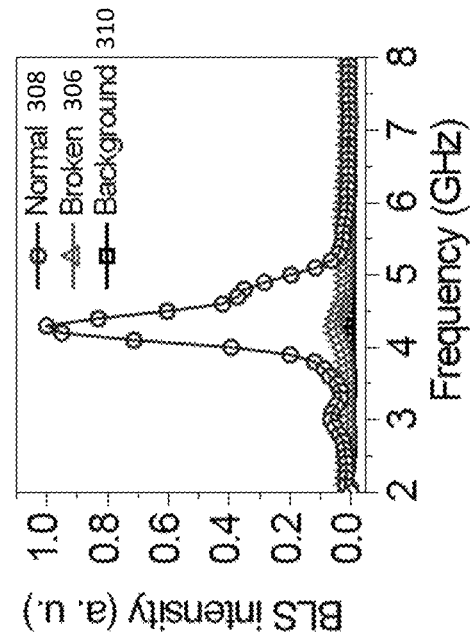
FIG. 3B shows the comparisons of BLS intensities for a waveguide according to an example embodiment and the broken waveguide of FIG. 3A. Background signal is also shown for reference which was obtained without the microwave excitation.

In order to investigate the effect of far-field excitation by the antenna 202, additional measurements were performed on a control sample, denoted as "broken sample" 300 and shown in FIG. 3A. The broken sample 300 is disconnected from the antenna 302 and the BLS spectra were recorded on the broken waveguide marked by the dot 304 in the SEM image shown in FIG. 3A. FIG. 3B shows a comparison of the BLS spectra of the broken sample 300 (curve 306) with the BLS spectra measured in a "normal" waveguide according to an example embodiment as shown in FIG. 2A (curve 308). The background signal (curve 310) which was obtained in the absence of microwave excitation is also included. The results for broken waveguide and background signal (curves 306, 310) are at the same low level compared to the normal waveguide spectra (curve 308). Therefore, the effect of far-field excitation is negligible in the measurements for the example embodiments described herein.

Figure 4B:
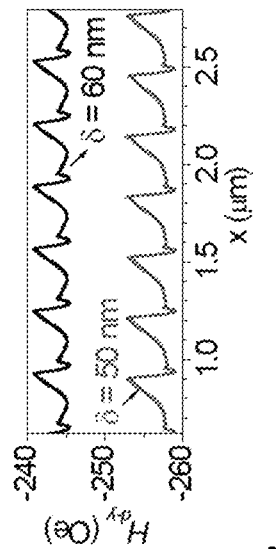
FIG. 4B illustrates a comparison of the y-component of the demagnetization field (Hd-y) along the centre of the waveguides according to example embodiments with δ=50 nm and 60 nm.
Figure 4C:
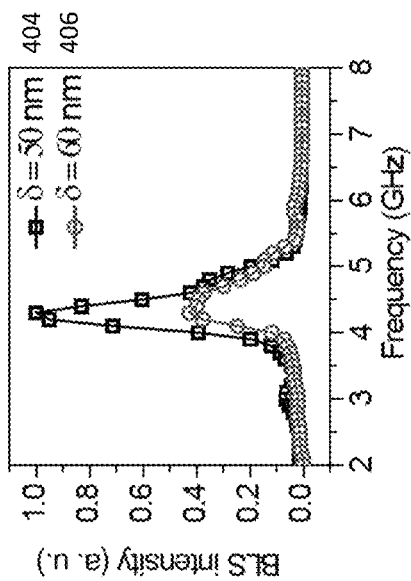
FIG. 4C shows the comparisons of BLS spectra for of the waveguides with δ=50 nm and 60 nm according to example embodiments.
Figure 4A:
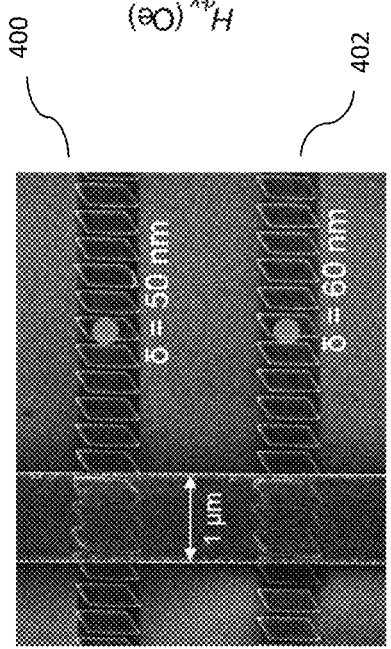
FIG. 4A shows the SEM image of the waveguides according to example embodiments with δ=50 nm and 60 nm.

In order to obtain the dependence of interelement gap (δ) on the propagation characteristics of the SWs, two waveguides 400, 402 with δ=50 and 60 nm, respectively, according to example embodiments were fabricated (FIG. 4A). The calculated reduction in the demagnetization field with the increase of δ from 50 nm to 60 nm is illustrated in FIG. 4B. BLS spectra recorded for the two waveguides 400, 402 are shown in FIG. 4C. Both the spectra show the SW mode at 4.2 GHz, but there is a significant difference between their intensities. More particularly the intensity for 50 nm is significantly higher than for 60 nm, compare curves 404, 406 in FIG. 4C. This may arise due to reduction in dynamic dipolar coupling and group velocity, noting that dynamic dipolar coupling is believed to depend on the interelement gap and group velocity is believed to be depended on the mode dispersion.

Magnon transmission at an angle without any bias field according to example embodiments.

Channeling SWs at different angles is realized in example embodiments using the same general device architecture as the embodiments described above. As a modification, and as shown in the SEM images in FIGS. 5A & 5D of two devices according to example embodiments where the waveguides 500, 502 are straight for the first four nanomagnets e.g. 504, 506, followed by 14° and 32° bents 508, 510, respectively, with respect to their antennae 512, 514. It is noted that the angle of the slanted edge (Φ) of the nanomagnets e.g. 504, 506 is also 32° in example embodiments. The dotted areas 516, 518 in the SEM images represent the regions where the spatial profiles of the SW modes were recorded. Prior to any measurement the waveguides were initialized to their FO state at remanence. It is understood from the spin wave dispersion that the surface spin waves (where, magnetization is perpendicular to the wavevector) has the highest group velocity and is easiest to detect which is important for device application. When the angle is increased in example embodiments, the efficiency of the spin wave propagation may be reduced due to moving away from this surface wave configuration.

BLS intensities were measured as a function of excitation frequency at the positions marked by dots 520, 522 in the SEM images and the spectra are shown in FIGS. 5B & 5E for the 14° and 32° curved waveguides 500, 502, respectively. Transmission of spin-wave signal at angles is observed with strong response 524, 526 around 4.2 GHz and 5.1 GHz for 14° and 32° curved waveguides, respectively. It is noted that the 32° curved waveguide 502 according to an example embodiment supports the SW mode at a higher frequency in comparison to the straight waveguide according to an example embodiment. This is possibly due to the reduction in $H_d$ along the curved section 510. This variation is smaller for the 14° curved waveguide 500 according to an example embodiment, where no significant change is observed in the spectra. It should be noted here that all the measurements were carried out without any bias magnetic field or current.

To investigate the spatial profiles of the spin-wave modes, two-dimensional spatial scanning was carried out for the prominent modes in 100 nm steps by raster scanning the laser spot and the results are shown in FIGS. 5C &5F for the curved waveguides 500, 502, respectively, according to example embodiments. As expected, the SW intensity drops faster as compared to the straight waveguide according to an example embodiment due to modification in the dynamic dipolar field near the bent which reduces the transmission efficiency. Nevertheless, clear BLS intensities can be observed much beyond the bent 508, 510 in the curved waveguides according to example embodiments.

Demonstration of gating of spin-wave propagation according to example embodiments. The above described results for example embodiments demonstrate the realization of low-power SW transmissions. In order to obtain digital functionalities, deterministic control of signal output which is encoded in the amplitude and/or phase of the SWs, is desired. In example embodiments, a mechanism to manipulate the amplitude of the propagating SWs is proposed. In order to experimentally demonstrate the proof-of-concept, three devices 600, 602, 604 according to example embodiments were designed, which are shown in FIGS. 6A, 7A & 8A. In these devices 600, 602, 604, the input (shown by boxes 606, 608. 610) refers to the microwave excitation using antennae and the output (shown by dots 612, 614, 616) is monitored by measuring the BLS intensity, thereby, the SW amplitude. Gating operation is realized by selectively patterning the waveguides and switching individual nanoelements e.g. 618, 620, 622 at the gate position (indicated by the arrows) using an external field. FIGS. 6B, 7B & 8B show the magnetic ground states after initializations with $H_{in}^{L}$ (i.e. applying and subsequently removing a saturating field along the long axes of the respective nanoelements) with all magnetization pointing in the same directions, i.e. the FO state and FIGS. 6C, 7C & 8C represent the magnetic states after initialization with $H_{in}^{W}$ (i.e. applying and subsequently removing a saturating field along the short axes of the respective nanoelements). It shows that the magnets, i.e. the nanoelements 618, 620, 622 point in the opposite direction at the arrow positions as compared to their previous FO state, which is denoted as FO* state.

Reversed magnetization directions in the FO* states are due to the predefined orientation of the RNMs 618, 620, 622 at the gate positions. Shape induced magnetic anisotropy is utilized in the example embodiments to achieve deterministic magnetic ground states of the RNM 618, 620, 622, noting again that other geometric shapes or alignments in addition to rhomboid can be used in different embodiments to achieve shape induced magnetic anisotropy. It is further noted that no bias field was applied during the signal manipulation once the waveguides are initialized to the FO or FO* state. The BLS intensities at the output for these two ground states shown in FIGS. 6D, 7D & 8D, indicate that the signal is strongly attenuated in the region after the reversed magnet position in comparison to the FO state, compare curves 624 and 626 in FIG. 6D, curves 628 and 630 in FIG. 7D, and curves 632 and 634 in FIG. 8D. The different intensity values are labeled as logic "1" and "0" states for further discussions.

For the devices 600, 602 (FIG. 6A, 7A), the most prominent SW modes are observed at 4.2 GHz, which is similar to the straight waveguide according to an example embodiments shown in FIG. 2, for both logic states. In the device (FIG. 8A), new SW modes are observed at logic "1" state with a strong intensity at 4.8 GHz, in addition to the mode at 4.2 GHz. Interestingly, logic "0" state of the device 604 has different SW modes altogether which shift towards higher frequency range, with the most prominent mode at 5.7 GHz and no response observed below 5.2 GHz, thereby, resulting in maximum intensity difference between "1" and "0" states for the gating operations. Thus, the example embodiments show that it is possible to tune the difference between the two logic levels for unambiguous identification of the different outputs.

It is noted that the FO* state of the device 604 represents an antiferromagnetic ground state in the waveguide. The large shift in the SW spectra for the device 604 between the FO and FO* states may be attributed to the reduction in Hd for the FO* state in comparison to the FO state. From micromagnetic simulations, it was found that the Hd-y reduces from −240 Oe in the case of FO state to ±25 Oe for the FO* state. This is in contrast with a waveguide made from interacting long nanowires such as described in Topp, J., Heitmann, D. & Grundler, D. Interaction effects on microwave-assisted switching of $Ni_{80}Fe_{20}$ nanowires in densely packed arrays. Phys. Rev. B 80, 174421 (2009). where quasistatic $H_d$ does not affect the SW spectra significantly.

It is noted that the $H_{d-y}$ for the FO state for the device 604 is similar to FIG. 1E. The 4.2 GHz SW mode was selected to investigate the two-dimensional spatial profiles for the FO and FO* states (FIGS. 6E-F, 7E-F & 8E-F). For these measurements the laser spot was raster scanned over a 3 μm×0.8 μm area in 100 nm step size. Sharp decrease of the signal at the location of the switched nanomagnet is observed in the FO* states whereas a continuous decay profile is found in the FO states. Almost no signal channels through the waveguide in the FO* state for the device 604, see FIG. 8F. To investigate the loss of signal at the control magnet position followed by transmission of SWs in the waveguide, micromagnetic simulations were carried out. It was observed that SWs propagate without a significant disturbance in phase when the waveguide is in the FO state. However, when a magnetic defect is introduced by switching one of the magnets (FO* state), a disturbance in the phase at the defect location is observed. This disturbance is associated with reflection and tunneling of SWs. From the amplitudes of the reflected and transmitted waves, the transmission efficiency appears be about 50% for a single RNM defect location.

Further discussion of the results for example embodiments.

The example embodiments utilize stripe antenna, external field and BLS techniques for excitation, manipulation and detection of SWs, respectively. For practical device applications, these are preferably carried out on-chip at nanoscale. Spin transfer torque and inverse spin Hall effect have recently shown promise as generation and detection mechanisms in nanomagnetic devices. As the nanomagnets in the waveguides according to example embodiments are physically separated, for gating operation one can selectively switch individual magnetic elements in which the magnetization reversal is primarily governed by its shape induced anisotropy instead of dipolar field induced coupling. Therefore, some of the established techniques which are used for writing in magnetic memories, can be implemented in devices according to example embodiments. For instance, a cross-point current array line can be used to apply orthogonal current or field pulses to switch the magnetization states. In order to estimate the switching field and time for magnetization reversal of an individual magnet in the waveguide, additional micromagnetic simulations were carried out using rectangular field pulses and the obtained values are about 500 Oe and 0.4 ns, respectively. Recently, switching of perpendicular magnetization and clocking of nanomagnetic logic was also demonstrated without an external magnetic field by using spin orbit torque for the first and spin Hall effect for the latter. It is noted that these are interfacial phenomena which depend on the thickness of the nanoelements. Such approaches may potentially reduce the power required for gating of the signal according to example embodiments. One of the main advantages of devices according to example embodiments is that there is no stand-by power for information transmission or manipulation once the device is initialized, which is suitable for ultra-low-power computing and non-volatile applications.

The size of a SW device is also an important factor for practical applications. The sub-micron size of devices of the described example embodiments was chosen to ensure a quasi-saturated magnetic ground magnetic state as well as to account for the limited spatial resolution (250 nm) of the detection technique using micro-BLS. It is noted that the magnetization reversal mechanisms of the RNMs behave similarly when they are scaled to half, that is (L×W×δ)= (300×130×50) nm3, according to example embodiments. Another important parameter is the operating frequency of the device which is largely dependent on the size of the device and the choice of the magnetic materials. Smaller magnet sizes and materials with high saturation magnetization according to example embodiments can significantly enhance the operating frequency.

The effect of stray field from other devices in a dense circuit may also be considered for optimization of the operating frequency according to example embodiments. It was found that the ground magnetic states of waveguides according to example embodiments are less sensitive to the stray field and fabrication defects, thus, advantageously making the devices robust for application purposes. The group velocity of the operating SW modes estimated from the dispersion curves is about 1.1 km/s for example embodiments, which multiplied with relaxation time defines the propagation length. The SW propagation distance can be enhanced by selecting appropriate low damping materials such as Heusler alloys, YIG and/or by utilizing anti-damping effect from the spin transfer torque, according to example embodiments.

Example embodiments described herein demonstrate for the first time the feasibility of spin-wave propagation in straight and curved nanoscale waveguides without applying an external bias magnetic field/current. The waveguide in example embodiments described herein consists of physically separated bi-stable rhomboid nanomagnets (RNMs) with the signal transmitted via long range dynamic dipolar field. Gating of SW signal propagation has been demonstrated in example embodiments described herein by switching the magnetization of single/multiple nanomagnets in the waveguides in order to manipulate the SW amplitude at the output. This approach advantageously supports ultra-energy-efficient operation by eliminating the need for stand-by power once initialized.

Methods Utilized in Example Embodiments

Sample fabrication: The devices according to embodiments described herein were fabricated using a combination of multistep electron beam lithography and optical lithography techniques on oxidized Si substrate (Si/SiO2). First, a single layer of positive resist PMMA (polymethyl methacrylate) was spin coated followed by e-beam beam lithography for patterning the waveguides consisting of the rhomboid nanomagnets. This was followed by the development of the sample in MIBK (methyl isobutyl ketone) and IPA (isopropyl alcohol) solution with MIBK:IPA=1:3. Thin film of magnetic Ni80Fe20 alloy (Permalloy) was subsequently deposited using e-beam evaporation in a chamber with a base pressure of 2×10−8 Torr. The desired waveguides structures were obtained after metal lift-off in acetone assisted by ultrasonic agitation. In a second step, a 1-µm-wide stripe antenna was patterned using e-beam lithography and lift-off processes as mentioned above. The antenna was made from 80 nm thick Pt deposited by sputtering on top of a 5 nm thick Cr adhesive layer deposited by e-beam evaporation techniques. Larger contact pads of the antenna with ground-signal-ground lines were patterned with optical lithography using PFI photoresist and AZ 300 MIF developer. Then, a thin film stack of Cr(5 nm)/Pt(200 nm) was deposited using the above mentioned deposition techniques followed by metal-lift off. Note that the dimensions of the GSG's were chosen to match 50 Ohm impedance. However, it will be appreciated that the present invention is not limited to the sample fabrication, materials, dimensions etc. as described in this paragraph, which is instead intended to facilitate enablement of at least one embodiment of the present invention.

BLS microscopy: Spin-wave signal were measured at room temperature using micro focused Brillouin light scattering (micro-BLS) technique where a monochromatic continuous wave solid state laser (wavelength=532 nm and power≈1 mW) is focused by using a 100× microscope objective with a large numerical aperture (N.A.=0.75) down to ~250 nm diffraction limited spot diameter. Scattered light from the sample is collected by the same microscope objective and analyzed with a Sandercock-type multi-pass tandem Fabry-Perot interferometer TFP-1 (JRS Scientific Instruments). The obtained BLS intensity is proportional to the SW intensity at the position of the laser spot. For two dimensional spatial mapping of the SW intensities the laser spot was raster scanned in steps of 100 nm using a closed-loop piezo scanner. Long-term image stabilization (better than 50 nm) was obtained by using an active-feedback algorithm. However, it will be appreciated that the present invention is not limited to the output mechanism as described in this paragraph, which is instead intended to facilitate enablement of at least one embodiment of the present invention.

Micromagnetic simulations: Micromagnetic simulations were performed using the Object Oriented Micromagnetic Framework (OOMMF) software which solves the Landau-Lifshitz-Gilbert (LLG) equation to obtain magnetization M as a function of time t and position r. Fourier transforming time and position dependent data, yields the SW dispersion in frequency and wavevector domains. These simulations were performed using a high performance computing cluster. A gyromagnetic ratio of 2.21×105 m/A s and exchange coefficient of 13 pJ/m were used in the simulations. A saturation magnetization Ms of 7.6×105 A/m as obtained from vibrating sample magnetometry was used. A large sample including 41 RNMs with one-dimensional periodic boundary condition was used to obtain a good resolution in the wave vector domain. The magnetization dynamics was triggered using a signal which excites the spectra uniformly in frequency and wave vector domains. More details of the simulation methods can be found elsewhere. The magnetic ground state was prepared by initially saturating the sample along the width of waveguide using an external magnetic field and then reducing that field to zero.

In one embodiment, a waveguide for spin wave (SW) transmission comprises a plurality of nanomagnetic material elements, each nanomagnetic material element having a respective predetermined geometric shape such that each nanomagnetic material element exhibits a deterministic ground state initializable by a magnetic field applied across the waveguide wherein the nanomagnetic material elements are disposed relative to each other for dipolar coupling between adjacent nanomagnetic material elements.

The nanomagnetic material elements may exhibit shape induced magnetic anisotropy.

A first set of the nanomagnetic material elements may be disposed relative to each other such as to define a first propagation direction for the SW transmission.

A second set of the nanomagnetic material elements may be disposed relative to each other such as to define a second propagation direction for the SW transmission different from the first propagation direction.

One or more of the nanomagnetic material elements may be disposed such they exhibit a different stable ground state compared to their neighboring nanomagnetic material elements initializable by the magnetic field applied across the waveguide in a first direction.

The one or more nanomagnetic material elements may be disposed such they exhibit substantially the same stable ground state compared to their neighboring nanomagnetic material elements initializable by the magnetic field applied across the waveguide in a second direction different from the first direction.

The one or more nanomagnetic material elements may be configured to manipulate an amplitude of a SW propagating in the waveguide depending on changes in their stable ground state compared to their neighboring nanomagnetic material elements.

The waveguide may comprise an input for exciting SWs in the waveguide.

The waveguide may comprise an output for probing SWs propagated by the waveguide.

Figure 9:
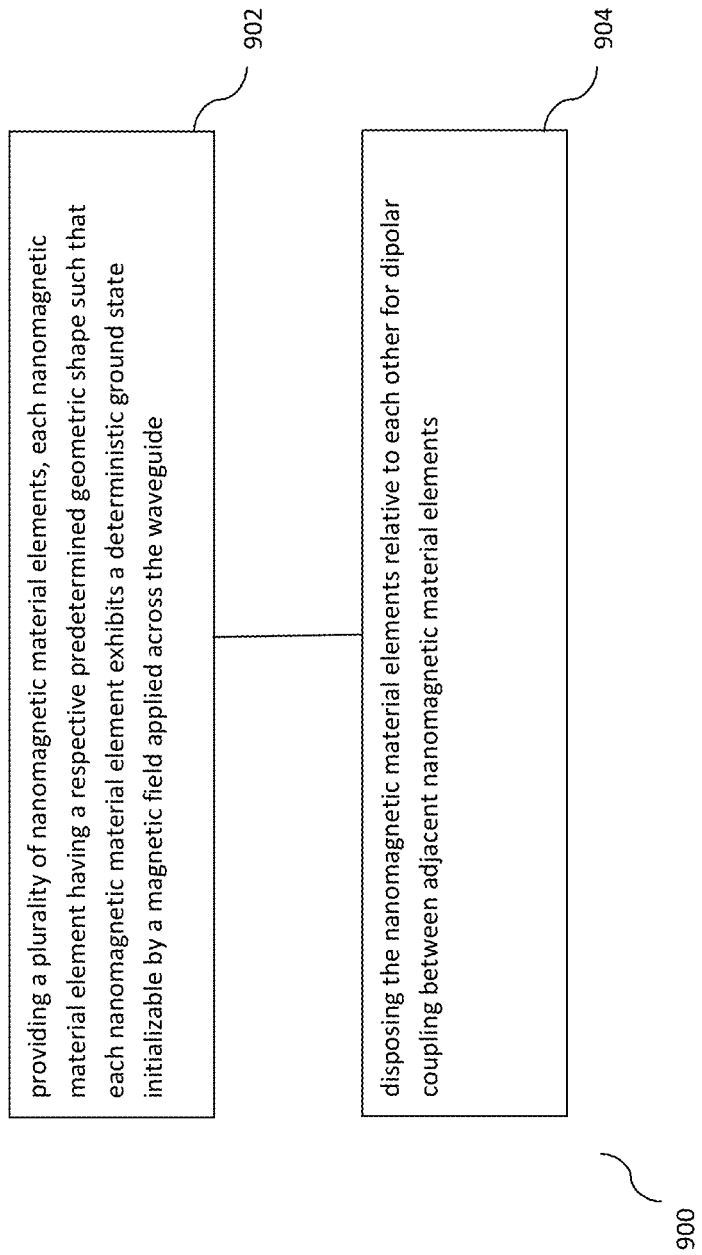
FIG. 9 shows a flowchart 900 illustrating a method of fabricating a waveguide for spin wave transmission, according to one embodiment.

FIG. 9 shows a flowchart 900 illustrating a method of fabricating a waveguide for spin wave (SW) transmission, according to one embodiment. At step 902, a plurality of nanomagnetic material elements is provided, each nanomagnetic material element having a respective predetermined geometric shape such that each nanomagnetic material element exhibits a stable ground state initializable by a magnetic field applied across the waveguide. At step 904, the nanomagnetic material elements are disposed relative to each other for dipolar coupling between adjacent nanomagnetic material elements.

The nanomagnetic material elements may exhibit shape induced magnetic anisotropy.

The method may comprise disposing a first set of the nanomagnetic material elements relative to each other such as to define a first propagation direction for the SW transmission.

The method may comprise disposing a second set of the nanomagnetic material elements relative to each other such as to define a second propagation direction for the SW transmission different from the first propagation direction.

The method may comprise disposing one or more of the nanomagnetic material elements such they exhibit a different deterministic ground state compared to their neighboring nanomagnetic material elements initializable by the magnetic field applied across the waveguide in a first direction.

The method may comprise disposing the one or more nanomagnetic material elements such they exhibit substantially the same stable ground state compared to their neighboring nanomagnetic material elements initializable by the magnetic field applied across the waveguide in a second direction different from the first direction.

The method may comprise configuring the one or more nanomagnetic material elements to manipulate an amplitude of a SW propagating in the waveguide depending on changes in their stable ground state compared to their neighboring nanomagnetic material elements.

The method may comprise providing an input for exciting SWs in the waveguide.

The method may comprise providing an output for probing SWs propagated by the waveguide.

Figure 10:
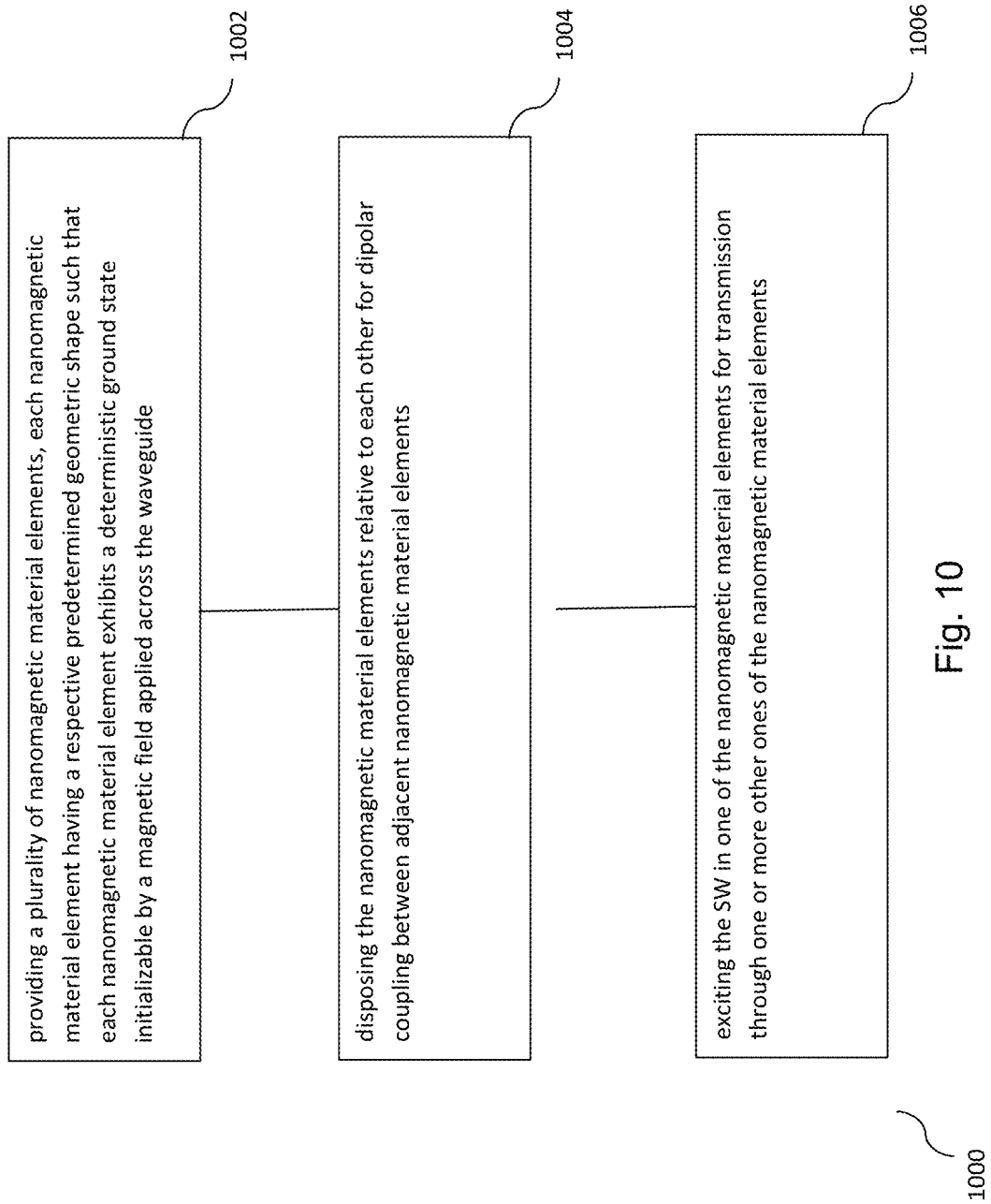
FIG. 10 shows a flowchart 1000 illustrating a method of transmitting a spin wave.

FIG. 10 shows a flowchart 1000 illustrating a method of transmitting a spin wave (SW). At step 1002, a plurality of nanomagnetic material elements is provided, each nanomagnetic material element having a respective predetermined geometric shape such that each nanomagnetic material element exhibits a deterministic ground state initializable by a magnetic field applied across the waveguide. At step 1004, the nanomagnetic material elements are disposed relative to each other for dipolar coupling between adjacent nanomagnetic material elements. At step 1006, the SW is excited in one of the nanomagnetic material elements for transmission through one or more other ones of the nanomagnetic material elements.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A waveguide for spin wave (SW) transmission comprising:
    a plurality of nanomagnetic material elements, each nanomagnetic material element having a respective predetermined geometric shape such that each nanomagnetic material element exhibits a deterministic ground state initializable by a magnetic field applied across the waveguide;
    wherein the nanomagnetic material elements are disposed relative to each other for dipolar coupling between adjacent nanomagnetic material elements; and
    wherein one or more of the nanomagnetic material elements are disposed such they exhibit a different stable ground state compared to their neighboring nanomagnetic material elements initializable by the magnetic field applied across the waveguide in a first direction.

2. The waveguide of claim 1, wherein the nanomagnetic material elements exhibit shape induced magnetic anisotropy.

3. The waveguide of claim 1, wherein a first set of the nanomagnetic material elements are disposed relative to each other such as to define a first propagation direction for the SW transmission.

4. The waveguide of claim 3, wherein a second set of the nanomagnetic material elements are disposed relative to each other such as to define a second propagation direction for the SW transmission different from the first propagation direction.

5. The waveguide of claim 1, wherein the one or more nanomagnetic material elements are disposed such they exhibit substantially the same stable ground state compared to their neighboring nanomagnetic material elements initializable by the magnetic field applied across the waveguide in a second direction different from the first direction.

6. The waveguide of claim 5, wherein the one or more nanomagnetic material elements are configured to manipulate an amplitude of a SW propagating in the waveguide depending on changes in their stable ground state compared to their neighboring nanomagnetic material elements.

7. The waveguide of claim 1, comprising an input for exciting SWs in the waveguide.

8. The waveguide of claim 1, comprising an output for probing SWs propagated by the waveguide.

9. A method of fabricating a waveguide for spin wave (SW) transmission, comprising the steps of:
   providing a plurality of nanomagnetic material elements, each nanomagnetic material element having a respective predetermined geometric shape such that each nanomagnetic material element exhibits a deterministic ground state initializable by a magnetic field applied across the waveguide;
   disposing the nanomagnetic material elements relative to each other for dipolar coupling between adjacent nanomagnetic material elements; and
   disposing one or more of the nanomagnetic material elements such they exhibit a different deterministic ground state compared to their neighboring nanomagnetic material elements initializable by the magnetic field applied across the waveguide in a first direction.

10. The method of claim 9, wherein the nanomagnetic material elements exhibit shape induced magnetic anisotropy.

11. The method of claim 9, comprising disposing a first set of the nanomagnetic material elements relative to each other such as to define a first propagation direction for the SW transmission.

12. The method of claim 11, comprising disposing a second set of the nanomagnetic material elements relative to each other such as to define a second propagation direction for the SW transmission different from the first propagation direction.

13. The method of claim 9, comprising disposing the one or more nanomagnetic material elements such they exhibit substantially the same stable ground state compared to their neighboring nanomagnetic material elements initializable by the magnetic field applied across the waveguide in a second direction different from the first direction.

14. The method of claim 13, comprising configuring the one or more nanomagnetic material elements to manipulate an amplitude of a SW propagating in the waveguide depending on changes in their stable ground state compared to their neighboring nanomagnetic material elements.

15. The method of claim 9, comprising providing an input for exciting SWs in the waveguide.

16. The method of claim 9, comprising providing an output for probing SWs propagated by the waveguide.

17. A method of transmitting a spin wave (SW), comprising the steps of:
   providing a plurality of nanomagnetic material elements, each nanomagnetic material element having a respective predetermined geometric shape such that each nanomagnetic material element exhibits a deterministic ground state initializable by a magnetic field applied across the waveguide;
   disposing the nanomagnetic material elements relative to each other for dipolar coupling between adjacent nanomagnetic material elements;
   exciting the SW in one of the nanomagnetic material elements for transmission through one or more other ones of the nanomagnetic material elements; and
   disposing one or more of the nanomagnetic material elements such they exhibit a different deterministic ground state compared to their neighboring nanomagnetic material elements initializable by the magnetic field applied across the waveguide in a first direction.

* * * * *